United States Patent
Frizzell et al.

(10) Patent No.: US 10,491,475 B2
(45) Date of Patent: Nov. 26, 2019

(54) PROXY AUTOMATIC CONFIGURATION FILE MANAGER

(71) Applicant: Bank of America Corporation, Charlotte, NC (US)

(72) Inventors: Michael T. Frizzell, Murphy, TX (US); Johannes A. Baartmans, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 234 days.

(21) Appl. No.: 15/664,044

(22) Filed: Jul. 31, 2017

(65) Prior Publication Data
US 2019/0036777 A1    Jan. 31, 2019

(51) Int. Cl.
*H04L 12/24* (2006.01)
*H04L 29/08* (2006.01)
*H04L 29/12* (2006.01)
*H04L 29/06* (2006.01)

(52) U.S. Cl.
CPC ........ *H04L 41/0886* (2013.01); *H04L 41/082* (2013.01); *H04L 61/1582* (2013.01); *H04L 63/0281* (2013.01); *H04L 67/02* (2013.01); *H04L 67/06* (2013.01); *H04L 67/28* (2013.01); *H04L 67/2804* (2013.01); *H04L 61/6013* (2013.01); *H04L 67/101* (2013.01)

(58) Field of Classification Search
CPC .. H04L 63/0281; H04L 67/28; H04L 61/6013
See application file for complete search history.

(56) References Cited

U.S. PATENT DOCUMENTS

| | | | |
|---|---|---|---|
| 7,873,707 B1 | 1/2011 | Subramanian et al. | |
| 8,527,631 B1 | 9/2013 | Liang | |
| 9,201,840 B2 | 12/2015 | Martini et al. | |
| 9,544,189 B2 | 1/2017 | Martini et al. | |
| 9,544,290 B2 | 1/2017 | Martini | |
| 2014/0259093 A1* | 9/2014 | Narayanaswamy | .... H04L 67/20 726/1 |

OTHER PUBLICATIONS

"Proxy Auto-config," Wikimedia Foundation, Inc., May 2, 2017.
Ciprian Adrian Rusen, "Simple Questions: What is a Proxy Server & Why Would You Use One," http://www.digitalcitizen.life/simple-questions-what-proxy-server-why-would-you-use-one, Jan. 1, 2014.

* cited by examiner

*Primary Examiner* — Chirag R Patel
(74) *Attorney, Agent, or Firm* — Weiss & Arons LLP; Michael A. Springs, Esq.

(57) ABSTRACT

A PAC file manager is provided. The PAC file manager may include PAC files. The PAC files may be generated by, and be resident on, a PAC server. The PAC file manager may include update processors. Each update processor may include a capability to transmit update information to the PAC server. The update information may be for updating URLs included in the PAC files. The PAC file manager may also include general processors and proxy servers. Each time a general processor launches a web browser, the general processor may download a PAC file from the PAC server. The PAC file may be stored in a temporary file associated with the general processor. Each PAC file may include instructions to be used to direct the associated general processor how to access the URL. The instructions may identify whether to use a proxy server and which specific proxy server to use.

16 Claims, 13 Drawing Sheets or please specify the following if not listed:
[ ] NBID of the proxy engineer
[ ] Email Address of proxy engineer user 4
user 5
user 6
user 7
user 8
user 9
user 10

NOTE:Commas are not allowed in any of the text fields.

| UNKNOWN | ChangeCrtl_Num/Remedy CRQ |
| UNKNOWN | Requesting LOB |
| UNKNOWN | LOB Contact |

Effective Date: (Note: "post"-dating affects whether the URL is included in the PAC file at the time of file generation)
May ∨ 25 ∨ 2017 🗓
Expiration Date: (Note: infomational only. Default is 2 years.)
May ∨ 25 ∨ 2019 🗓
Comment:
Implemented by user 1

Region EMEA_110    [Submit Query]

Last update by April 11, 2017 by user 1

FIG. 6 (Cont.)

```
Jump to PACTESTER Output after screen turns Light Blue
//
// EMEA PAC File

// ************************************************************//
//                                                              //
//    EMEA PAC FILE UPDATES NOW MADE AT                         //
//    XXXX.PROD.COM                                             //
//                                                              //
// ************************************************************//
function FindProxyForURL (url, host)
{
host = host. toLowerCase () ;
url = url. toLowerCase () ;

//EMEA_111: Blocked URL
if (shExpMatch (host, "*.eml") ||
shExpMatch (host, "*,nws"))
return "PROXY blocked";

//EMEA_112: PREEMPTIVE
if (shExpMatch (host,) ||
shExpMatch (host,) ||
shExpMatch (host,) ||
shExpMatch (host,))
return "PROXY:8080";

//EMEA_113: PREEMPTIVE DIRECT
if (shExpMatch (host,) ||
shExpMatch (host,) ||
shExpMatch (host,) ||
shExpMatch (host,) ||
```

FIG. 7

```
shExpMatch (host, "coupons.com") ||
shExpMatch (host, "cowboysoffer.com") ||
shExpMatch (host, "cpinvest-dev.com") ||
shExpMatch (host, "cpinvest-preprod.com") ||
shExpMatch (host, "cpinvest-test.com") ||
shExpMatch (host, "cpinvest-uat.com") ||
shExpMatch (host, "cpinvest.com") ||
shExpMatch (host, "cpmobile.pp.com") ||
shExpMatch (host, "cpmobile-pp1.com") ||
shExpMatch (host, "cpmobile-test.com") ||
shExpMatch (host, "cpmobile-test1.com") ||
shExpMatch (host, "cpmobile-test2.com") ||
shExpMatch (host, "cpmobile.com") ||
shExpMatch (host, "cpmobile1.com") ||
shExpMatch (host, "cpmobile2.com") ||
shExpMatch (host, "cpo-ach.com") ||
shExpMatch (host, "cpoestatements-test.com") ||
shExpMatch (host, "cpoestatements.com") ||
shExpMatch (host, "cpofreedom-preprod.com") ||
shExpMatch (host, "cpofreedom-test.com") ||
shExpMatch (host, "cpofreedom.com") ||
shExpMatch (host, "cpoinforeporting-preprod.com") ||
shExpMatch (host, "cpoinforeporting-test.com") ||
shExpMatch (host, "cpoinforeporting-test1.com") ||
shExpMatch (host, "cpoinforeporting-test2.com") ||
```

FIG. 7 (Cont.)

```
shExpMatch (host, "cpoinforeporting.com") ||
shExpMatch (host, "sap-13p.com") ||
shExpMatch (host, "sap-23p.com") ||
shExpMatch (host, "search.com") ||
shExpMatch (host, "srp0wn.com") ||
shExpMatch (host, "srp0wn.com") ||
shExpMatch (host, "training.com") ||
shExpMatch (host, "vipa-application.com") ||
shExpMatch (host, "vipa-intranet.com") ||
shExpMatch (host, "virtual-academy.com") ||
return "PROXY ringfenceproxy.com:8080";

//EMEA_225: AMRS INTERNET rrwebproxy
if (shExpMatch (host, "secure.co.uk") ||
shExpMatch (host, "www.xxx.com") ||
shExpMatch (host, "test1uat*.mysite.com") ||   /702
shExpMatch (host, "test2.mysite.com") ||        /704
shExpMatch (host, "test3.mysite.com") ||        /706
return "PROXY webproxy.com:8080";
shExpMatch (host, "test1.mysite.com") |         /708
| //EMEA_118: Proxy_iglbem
if (shExpMatch (host,) ||
shExpMatch (host,) ||
```

FIG. 7 (Cont.)

PROXY AUTOMATIC CONFIGURATION FILE MANAGER

FIELD OF TECHNOLOGY

This invention relates to proxy automatic configuration ("PAC") files, and methods and apparatuses for management thereof.

BACKGROUND OF THE DISCLOSURE

Many servers may include PAC files. A PAC file may be a file that is typically used to direct a web browser to a location. The location may be associated with, or identified by, a uniform resource locator ("URL").

The PAC file may include directions for use by the web browser on how to access one or more locations. In order to access the locations, a proxy server may be required. Therefore, included in the directions, may be proxy server identification information ("proxy server information"). The proxy server information may be used by the web browser to access the URL.

Because URLs may be updated frequently, the directions included in the PAC files may require frequent updating. In a networked environment that includes many servers and many PAC files it may be difficult to keep the PAC files up to date. Therefore, it may be desirable to provide systems and methods that manage and consolidate PAC files and the updating thereto.

SUMMARY OF THE DISCLOSURE

A PAC file manager is provided. The PAC file manager may include one or more PAC files. In some embodiments, the PAC file manager may include at least two PAC files. A first PAC file, included in the PAC file manager, may be referred to herein as a first PAC file. A second PAC file, included in the PAC file manager, may be referred to herein as a second PAC file.

The PAC file manager may be configured to maintain a dataset for each of the PAC files. There may be a segment of data identified within the dataset. The segment of data may be included in the dataset associated with the first PAC file. The PAC file manager may log the segment of data to be included in a second PAC file. The segment of data may be incorporated into the second PAC file at the time that the second PAC file is generated.

The PAC file manager may be configured to receive a plurality of URL updates. The URL updates may be for inclusion in a dataset and/or in the PAC files. The URL updates may include updates to URLs included in the PAC files. The URL updates may be received from a plurality of update processors. Updates received from processors other than the update processors, may be rejected as being invalid.

The PAC file manager may be configured to store the URL updates in a storage location. The storage location may be included in the PAC file manager. The storing may be executed upon receipt of the URL updates.

The PAC file manager may be configured to update the dataset associated with each PAC file. An update may include copying stored updates into a dataset. The updating may be executed upon completion of a predetermined time period.

The PAC file manager may be configured to generate each PAC file based on the associated dataset. The file generation may be initiated upon completion of a second predetermined time period. The generated PAC file may include the appropriate URL updates.

During the PAC file generation, the PAC file server may copy the identified segment of data into the second PAC file. It should be appreciated that copying the identified segment of data into the first PAC file after the update is complete may minimize update anomalies.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows an illustrative proxy automatic configuration file in accordance with principles of the invention.

DETAILED DESCRIPTION OF THE DISCLOSURE

Figure 1:
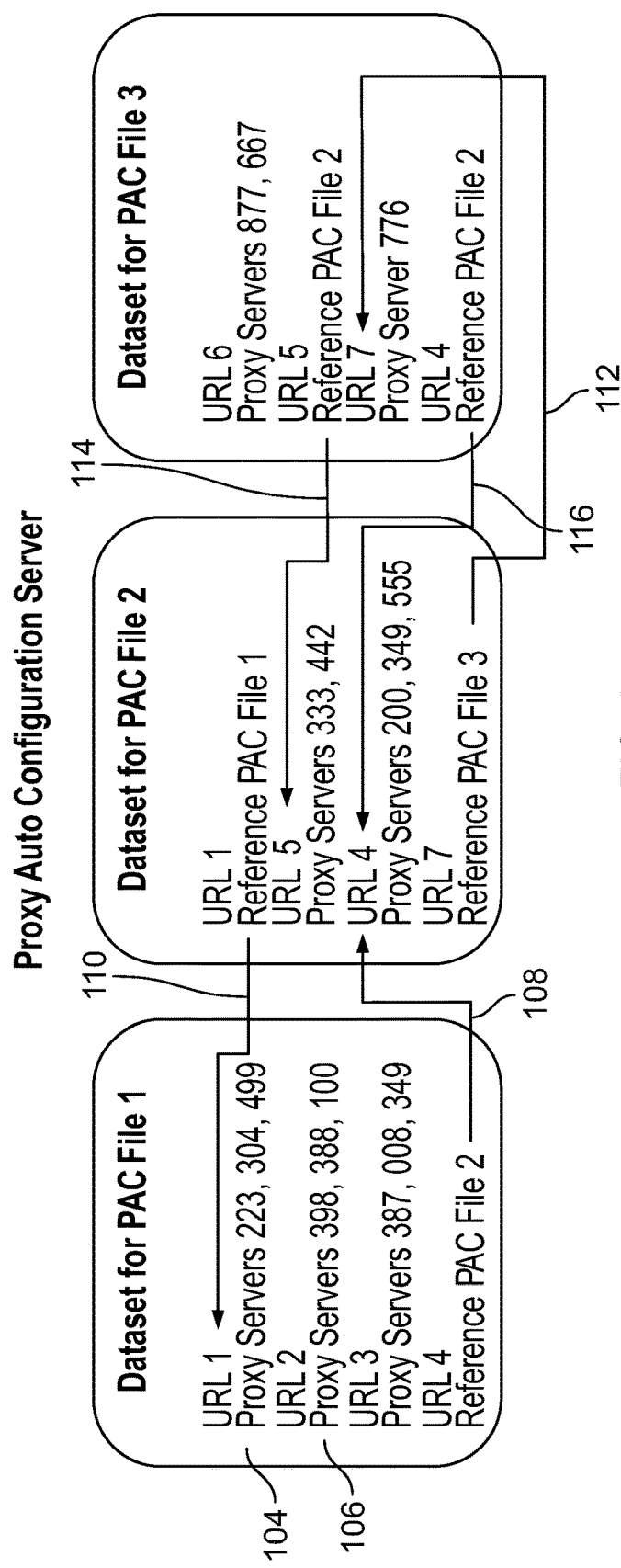
FIG. 1 shows an illustrative diagram in accordance with principles of the invention.

A method for managing proxy auto configuration files using a PAC file manager is provided. The method may include maintaining a dataset for each of the PAC files. The dataset may be maintained in a database server. The PAC file may be maintained in a PAC file server. A segment of data may be identified within the first PAC file. The segment of data may be logged by the PAC file manager to be included in a second PAC file. The inclusion may occur during the generation of the second PAC file.

The method may include receiving a plurality of URL updates. The URL updates may be for inclusion in the PAC files. The URL updates may be received from a plurality of update processors.

Upon receipt of the URL updates, the method may include storing the URL updates in a storage location. The storage location may be included in the PAC file manager.

The method may include updating the dataset associated with each PAC file. The updating may be executed after a first predetermined time period. The updating may include, for each PAC file, copying the stored updates into the dataset associated with the PAC file.

The method may include generating each PAC file. The generating may be executed after a second predetermined time period. In some embodiments, the first predetermined time period and the second predetermined time period may occur simultaneously. In other embodiments, the first predetermined time period and the second predetermined time period may occur sequentially. At times, the first predetermined time period may occur prior to the second predetermined time period. Other times, the second predetermined time period may occur prior to the first predetermined time period.

Each generated PAC file may include the appropriate URL updates. During the PAC file generation, the PAC file server may copy the identified segment of data included in the dataset associated with the first file into the second PAC file. It should be appreciated that multiple segments of data may be identified to be included in multiple PAC files. In some embodiments, the PAC file manager may maintain a table to manage which segments of data should be included in which PAC files.

The method may include deploying the PAC files into a production environment. The deployment may be executed by a deployment server. In some embodiments, the deployment may be executed by the PAC server.

The PAC file may be referenced by a plurality of general processors' web browsers. The PAC file may reference a plurality of proxy servers. Each time a general processor launches a web browser to access a URL and/or changes a proxy configuration LAN (local area network) setting on the web browser, the general processor is configured to download one of the PAC files from the PAC file server. The PAC file may be stored in a temporary file associated with the general processor.

Each PAC file may include instructions. The instructions may be used to direct the associated general processor how to access the URL. The instructions may include directions for use by a web browser. The web browser may be associated with the general processor. The instructions may teach how to reach the URL. The instructions may identify whether or not to use a proxy server. When the instructions include using a proxy server, the instructions may identify which proxy server is required to access the URL.

The method may include receiving a request from a user. The user may be entitled to update permissions. The user may be associated with an update processor. The request may be to change and/or update, in the second PAC file, the identified segment of data. Upon receipt of the request, the method may include disabling the user from updating the segment of data.

The method may include receiving a request from a user. The user may be entitled to update permissions. The user may be associated with an update processor. The request may be to change and/or update, in the first PAC file, the identified segment of data. Upon receipt of the request, the method may include disabling the user from updating the segment of data.

Each PAC file may include a plurality of URLs mapped to the plurality of proxy servers. At least one URL may be exclusively resident within one of the PAC files. Each PAC file may include URLs mapped to categories of proxy servers.

Upon determination of a category of a proxy server from the URL, the general processor may transmit a request to a load balancer. The request may be for a specific proxy server associated with the category of proxy servers.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Networking environments may use proxy servers in numerous instances. A proxy server may be a server that sits between a first server and a network, such as the internet. In one example, a proxy server may receive a URL request from a first server. The proxy server may retrieve data, associated with the URL, from a network, such as the internet. The proxy server may cache the retrieved data and transmit the data information to the first server for display on the first server. It should be appreciated that the proxy server may operate without disrupting or disabling first server functionality or network capabilities.

A proxy server may be used for security purposes, bandwidth-reduction, server reporting and a variety of other objectives. As a security mechanism, the proxy server may prevent a location on a network, such as a URL address on the internet, from identifying the end-requestor. The proxy server may typically present its own IP address when requesting the URL information, thereby obfuscating the end-user of the URL. Obfuscating the end-user may minimize vulnerability of the end-user.

Additionally, the proxy server may server as a security gateway or filter. The proxy server may allow all websites except those included in a list of banned websites—i.e., blacklisting. In the alternative, the proxy server may allow websites included in a list of permissible websites to the exclusion of all other websites—i.e., whitelisting. The proxy server may also document the websites that each server accessed.

Furthermore, each ingress/egress point in a network presents security risks. Just as in a house, each window and door presents an avenue for a person with malicious intent to enter, and for valuables to exit; in a computer network, every ingress/egress points, presents an opportunity for a hacker to enter and steal confidential information. By limiting the ingress/egress points to specific proxy servers, as opposed to each individual server acting an ingress/egress point, the vulnerability of the system is minimized.

FIG. 1 shows an illustrative diagram of data included in a PAC server. The PAC server may store a dataset for each of a plurality of PAC files. Each stored dataset may be used to generate a PAC file.

Each dataset may include URL information and proxy server information. The dataset may include instructions. The instructions may be used by a web browser to access a specific URL. The instructions may include, for a specific PAC file, whether a proxy server is required to access the specific URL, and specific proxy server information when a proxy server is required.

Dataset for PAC file 1 may include instructions for exemplary URL 1. The instructions for URL 1 are shown at 104. Instructions 104 show that a web browser attempting to access URL 1 may be required to access URL 1 via exemplary proxy servers 223, 304 and 449. It should be appreciated that exemplary proxy servers may be both ingress points, which enable communication of the web browser to other servers within a network, or egress points, which enable communication of the web browser to servers external to the network.

Dataset for PAC file 1 may include instructions for exemplary URL 2. The instructions for URL 2 are shown at 106. Instructions 106 show that a web browser attempting to access URL 2 may be required to access via exemplary proxy servers 398, 338 and 100. Dataset for PAC file 1 may also include URL 3. URL 3 may be configured to be accessed via exemplary proxy servers 387, 008 and 349.

Dataset for PAC file 1 may also include URL 4. URL 4 may be included on a different dataset for a different PAC file. The instructions associated with URL 4 may be included in dataset for PAC file 2. In order to maintain coordination and avoid update anomalies of the instructions for URL 4 included in dataset for PAC file 1 and dataset for PAC file 2, the instructions for URL 4, included in PAC file 1, may reference the instructions for URL 4, included in PAC file 2, as shown at 108.

Instructions for URL 1, included in dataset for PAC file 2, may reference PAC file 1, as shown at 110. Instructions for URL 7, included in dataset for PAC file 2, may reference dataset PAC file 3, as shown at 112. Instructions for URL 5, included in dataset for PAC file 3, may reference PAC file 2, as shown at 114. Instructions for URL 4, included in dataset for PAC file 3, may reference PAC file 2, as shown at 116.

Figure 2:
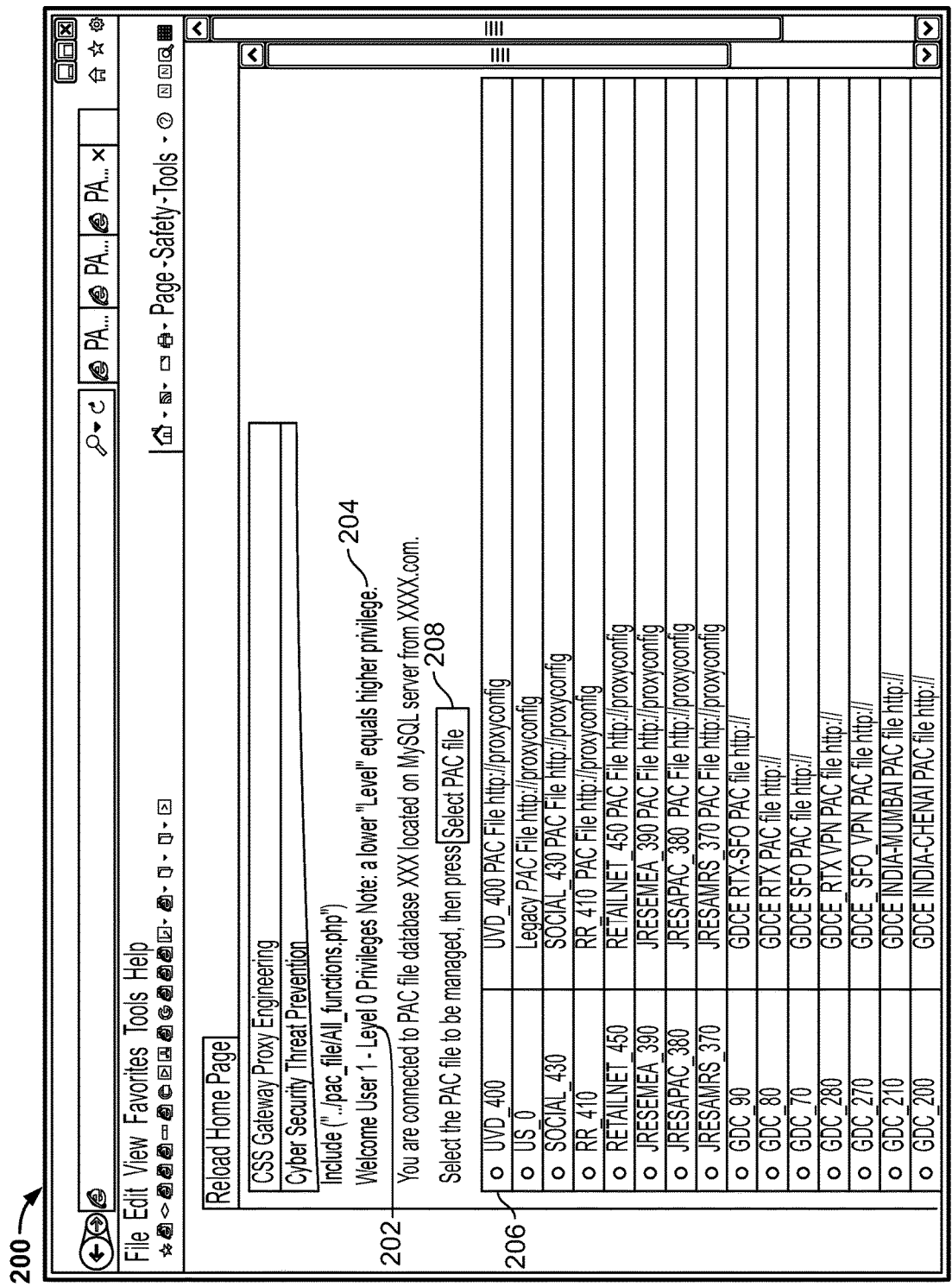
FIG. 2 shows an illustrative graphical user interface ("GUI") in accordance with principles of the invention.

FIG. 2 shows GUI 200. GUI 200 may be a homepage for a PAC file manager. User 1 may have logged onto GUI 200, as shown at 202. User 1 may have level zero privileges, also shown at 202. It should be appreciated that level zero privileges may be the highest privilege level, as shown at 204.

GUI 200 may include various PAC files to be managed, as shown at table 206. Upon selection of a specific PAC file, user 1 may select selection button 208.

Figure 3:
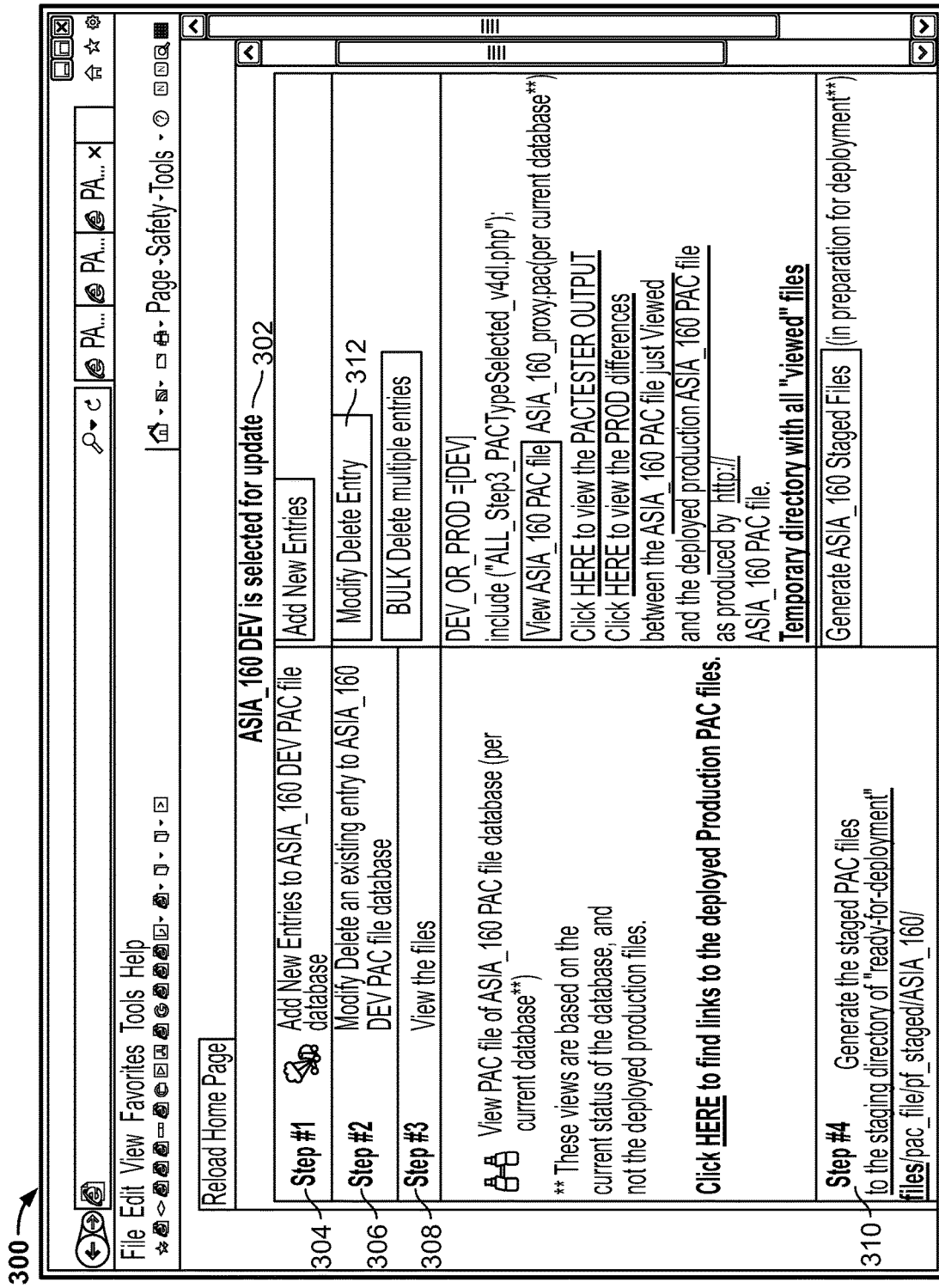
FIG. 3 shows another illustrative GUI in accordance with principles of the invention.

FIG. 3 shows GUI 300. GUI 300 may be displayed upon selection of a specific PAC file, included in GUI 200. PAC file named ASIA_160 may be selected for an update, as shown at 302. Step #1 may enable new entries to be added to ASIA_160 file database, as shown at 304. Step #2 may enable a user to modify and/or delete an existing entry to ASIA_160 development PAC file database, as shown at 306. Step #3 may enable a user to view the files included in the ASIA_160 APC file database, as shown at 308. Step #4 may enable generation of the staged PAC files to a staging directory, as shown at 310. A staging directory may include PAC files that are ready for deployment.

Figure 4:
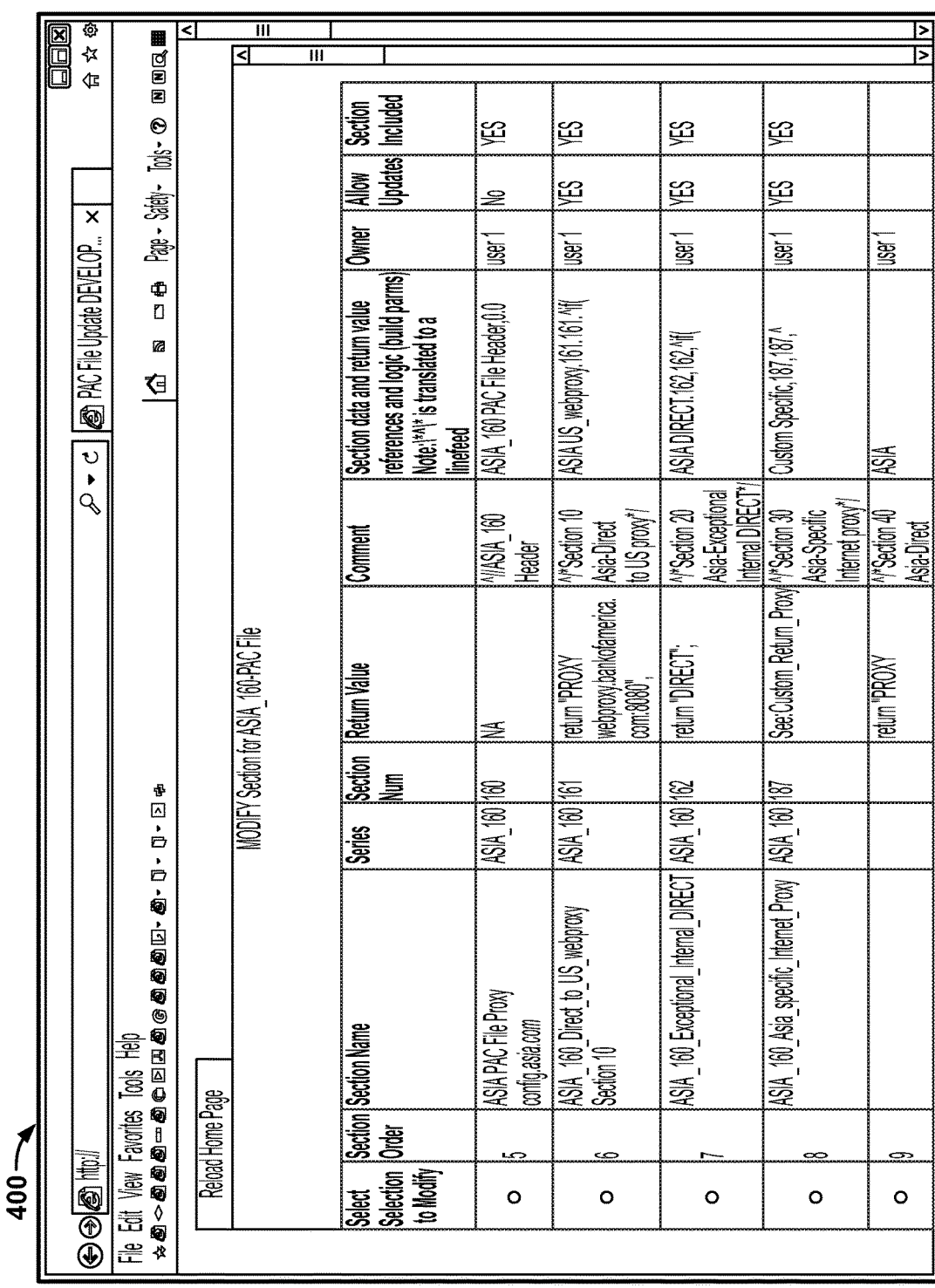
FIG. 4 shows yet another illustrative GUI in accordance with principles of the invention.
Figure 4:
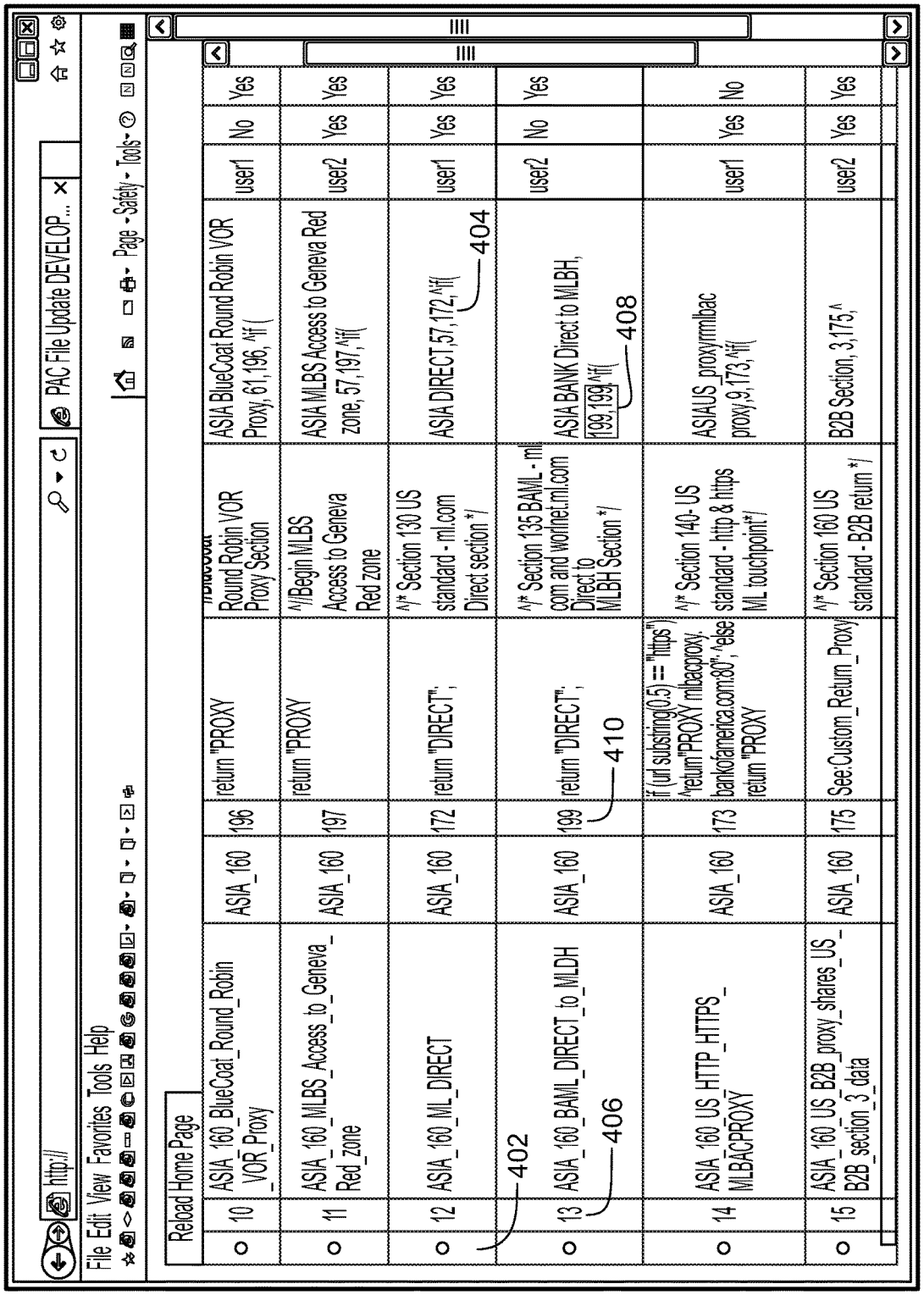

FIG. 4 shows GUI 400. Upon selection of modify button 312, shown on FIG. 3, a user may be directed to GUI 400. GUI 400 may include enabling a user to modify sections of ASIA_160 PAC file database.

A section, included in ASIA_160 PAC file may include metadata relating to each section. The metadata may include section order, section name, series, section number, return value, comment, section data and return value references and logic (build parameters), owner, Boolean allow updates and Boolean section included.

Each section may include a section number. Section data may be identified by a section number. When a section and its data are identified by the same number, the section may own the data, and therefore, have modify rights on the data. When a section and a portion of its data are identified with different numbers, the section may "borrow" the data, and therefore, lack modify rights on the data.

Section 12 may be shown at 402. Section 12 may include section number 172, as shown at 404. Section 12 may include data from section 57 and from section 172. A user that has permission to update section 172 may only be able to update the section 172 data, and not the data which is "borrowed" from section 57. In order to modify the data included in section 57, the user may be required to obtain update permissions for section 57, and update the section 57. Upon updating section 57, section 57 data may be updated in both section 57 and section 172.

Section 13, may be shown at 406. As shown at 408 and 410, section 13 may own its data and therefore have update permissions on its data.

Figure 5:
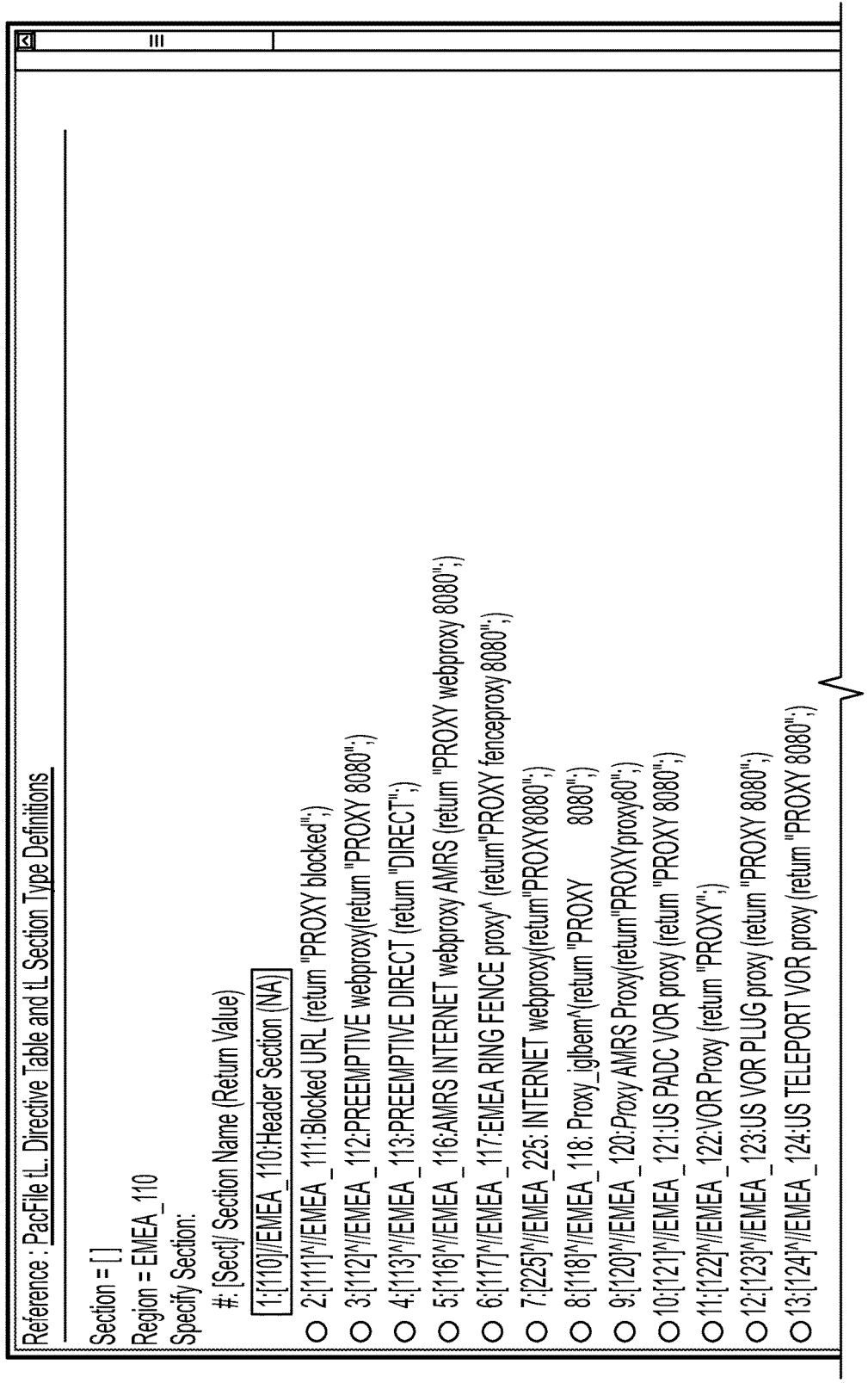
FIG. 5 shows still another illustrative GUI in accordance with principles of the invention.
Figure 5:
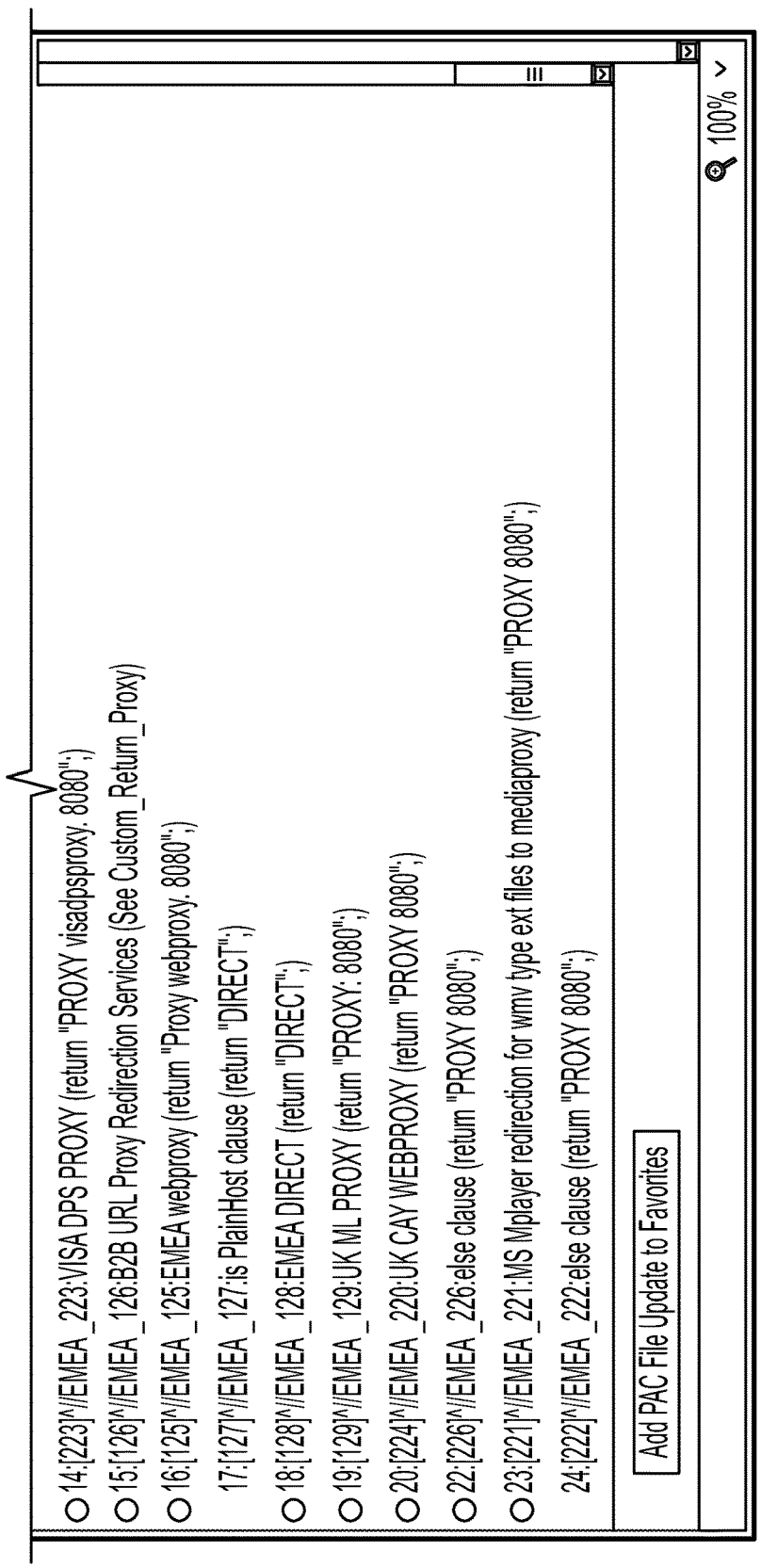

FIG. 5 shows GUI 500. GUI 500 may include a plurality of sections included in a PAC file database. Some of the sections, labeled 2-16 and 18-23 may be owned by the specified PAC file database, and therefore, may include radio buttons. The radio buttons may enable a user to modify the sections. Other sections, such as 1, 17 and 24 may be included in other PAC file databases, and therefore, may not be updatable in the specified PAC file database.

Figure 6:
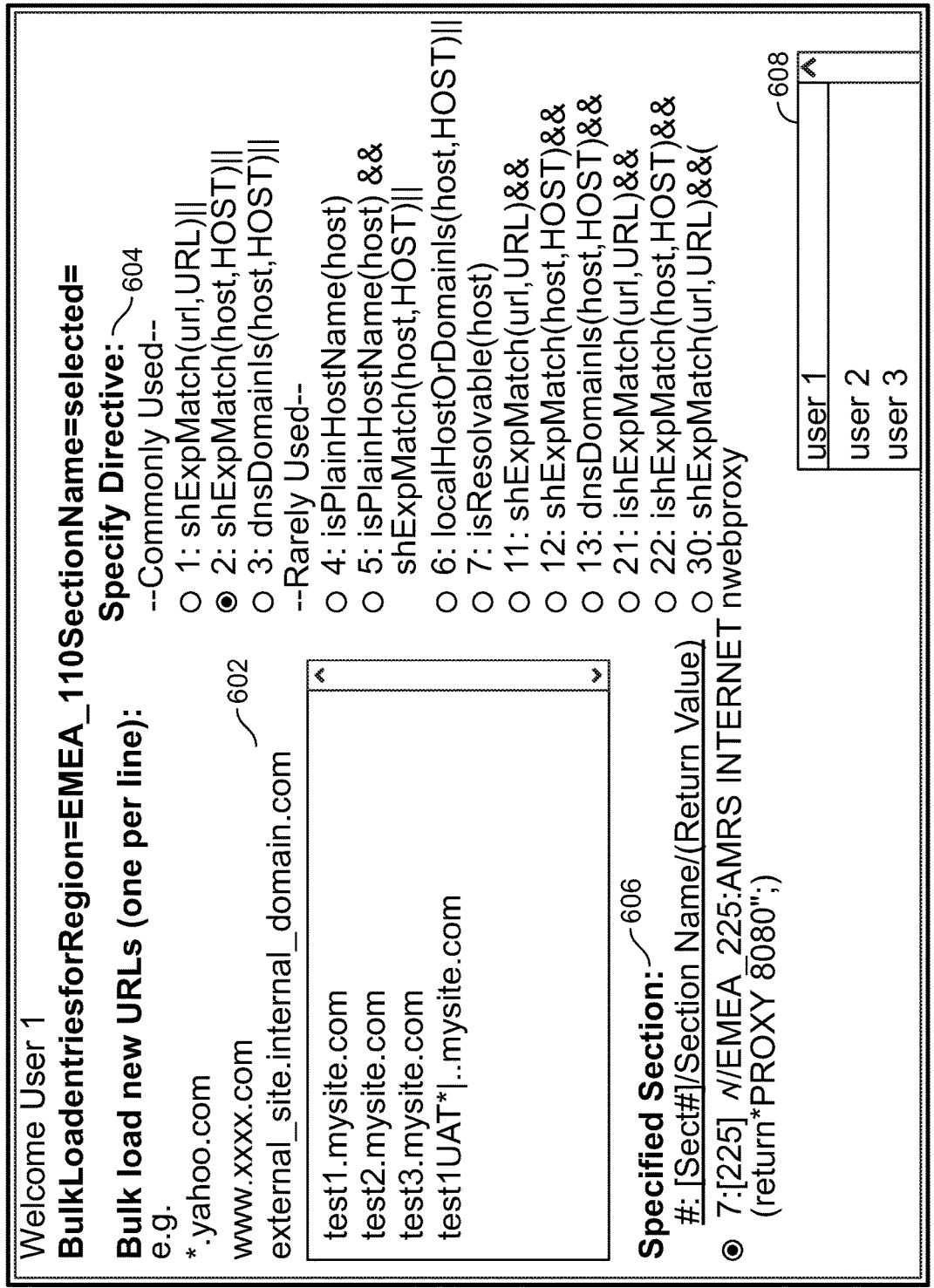
FIG. 6 shows still another GUI in accordance with principles of the invention.

FIG. 6 shows GUI 600. GUI 600 may include an interface for bulk loading of URLs to a PAC file database. A user may enter URL names at 602. A user may also specify directives to be used, at 604. A user may specify a section to enter the URLs, as shown at 606. A user may enter users associated with the URLs, as shown at 608. A user may enter a variety of other metadata associated with the URLs.

FIG. 7 shows an exemplary PAC file. Upon entry of the URLs included in FIG. 8, the associated PAC file may include the added URLs, as shown at 702, 704, 706 and 708. It should be appreciated that the selected directives have been appended to the URLs. It should also be appreciated that the URLs have been placed in the selected section.

Figure 8:
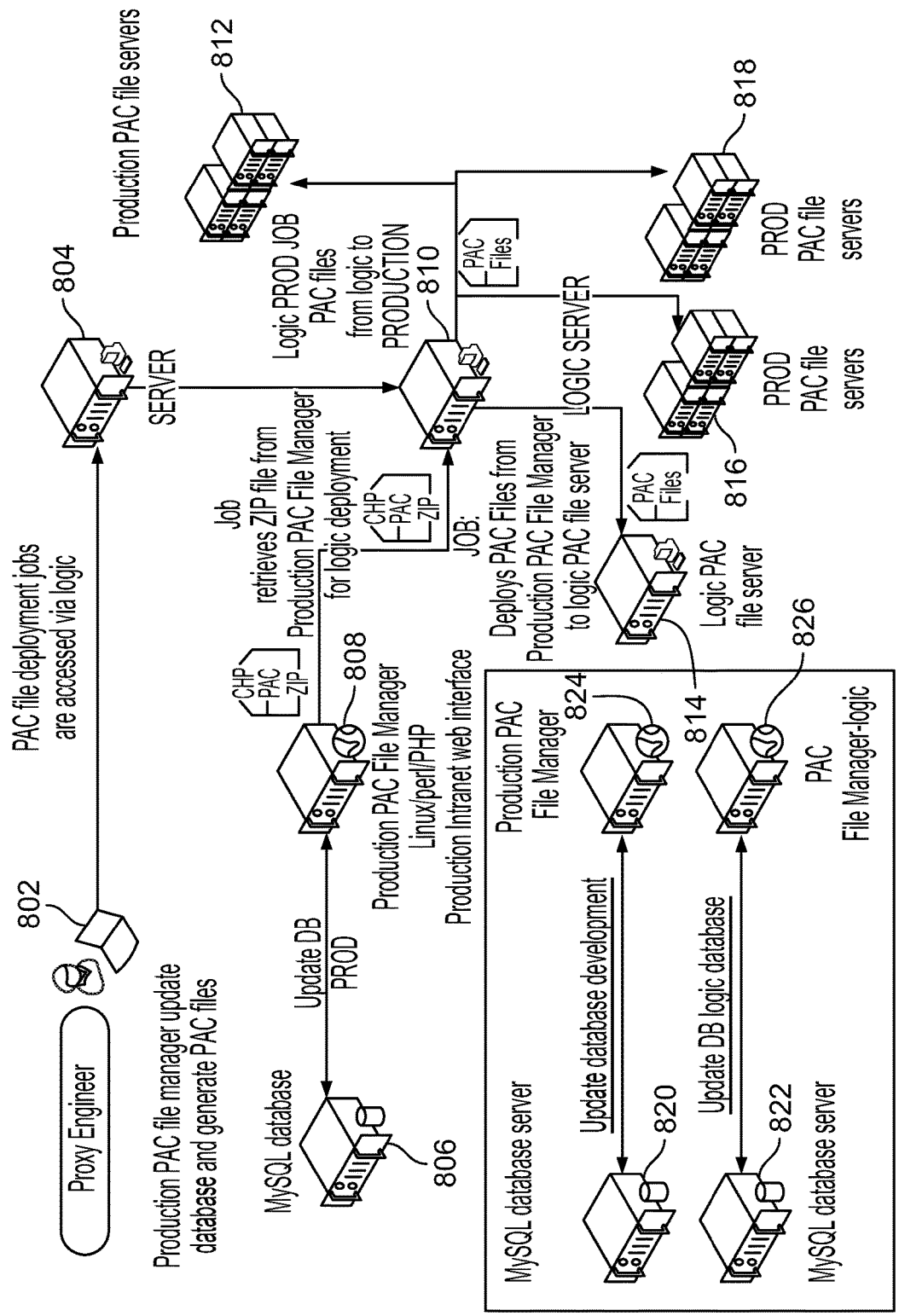
FIG. 8 shows an illustrative proxy automatic configuration file deployment architecture in accordance with principles of the invention.

FIG. 8 shows an exemplary architecture associated with updating URLs in a PAC file system. Proxy Engineer 802 may transmit database updates and generated PAC files to Production intranet web interface 808. Production intranet web interface 808 may transmit updates to the production database to and from MySQL database server 806. Each job included in PAC file server 810 may retrieve zip file for deployment from production intranet web interface 808.

Proxy Engineer 802 may transmit PAC file deployment jobs to server 804. The deployment jobs may be accessed via logic. Server 804 may transmit the jobs to PAC file server 810. Using logic, PAC file server 810 may transmit the PAC files to production servers 812, 814, 816 and 818.

On the development end, MySQL server 820 may update development database included in development PAC file manager 824. MySQL database server 822 may also update the logic database included in logic PAC file manager 826.

Thus, methods and apparatus for a proxy automatic configuration file manager have been provided. Persons skilled in the art will appreciate that the present invention can be practiced by other than the described embodiments, which are presented for purposes of illustration rather than of limitation. The present invention is limited only by the claims that follow.

What is claimed is:

1. A proxy auto configuration ("PAC") file manager, said PAC file manager being configured to:
   comprise at least two PAC files;
   maintain a dataset, in a PAC server, for each of the PAC files, wherein a segment of data, included in the dataset associated with a first PAC file, is logged by the PAC file manager to be included in a second PAC file when the second PAC file is generated;
   receive a plurality of uniform resource locator ("URL") updates, said URL updates to be included in the PAC files, the URL updates being received from a plurality of update processors;
   upon receipt of the URL updates, store the URL updates in a storage location included in the PAC file manager;
   after a predetermined time period, update the dataset associated with each PAC file, wherein each update comprises, for each PAC file, copying the stored updates into the dataset associated with the PAC file; and
   after a second predetermined time period, generate each PAC file, wherein
   each generated PAC file includes the appropriate URL updates; and
   during the PAC file generation, the PAC file server copies the segment of data, included in the associated with the first PAC file, into the second PAC, file;

include a deployment server, the deployment server being configured to deploy the PAC files into a production environment;

comprise a plurality of general processors;

comprise a plurality of proxy servers;

wherein:

each time a general processor, included in plurality of general processors, launches a web browser to access a URL and/or changes a setting on the web browser, the general processor is configured to download one of the PAC files from the PAC server, said PAC file being stored in a temporary file associated with the general processor;

each PAC file includes instructions, said instructions to be used to direct the associated general processor how to access the URL, said instructions including directions for use by a web browser, the web browser associated with the general processor, said instructions for teaching how to reach the URL, said instructions identifying whether or not to use a proxy server, and when the instructions include using a proxy server, identifying which proxy server, included in the plurality of proxy servers, is required to access the URL.

2. The PAC file manager of claim 1, wherein when a user, said user being entitled to update permissions, attempts to change and/or update, in the second PAC file, the segment of data included in the dataset associated with the first PAC file, the PAC file manager disables the user from updating the segment of data.

3. The PAC file manager of claim 1, wherein when a user, said user being entitled to update permissions, attempts to change and/or update, in the first PAC file, the segment of data included in the dataset associated with the first PAC file, the PAC file manager enables the user to change and/or update the segment of data.

4. The PAC file manager of claim 1, wherein each PAC file comprises a plurality of URLs mapped to the plurality of proxy servers.

5. The PAC file manager of claim 4, wherein at least one URL, included in the pluralities of URLs, is exclusively resident on one of the PAC files.

6. The PAC file manager of claim 1, wherein each PAC file comprises URLs mapped to categories of proxy servers.

7. The PAC file manager of claim 6, wherein upon determination of a category of a proxy server for the URL, the general processor transmits a request to a load balance for a specific proxy server associated with the category of proxy servers.

8. A method for managing proxy auto configuration ("PAC") files using a PAC file manager, the method comprising:

maintaining a dataset, in a PAC server, for each of the PAC files, wherein a segment of data, included in the dataset associated with a first PAC file, is logged by the PAC file manager to be included in a second PAC file when the second PAC file is generated;

receiving a plurality of uniform resource locator ("CURL") updates, said URL updates to be included in the PAC files, the URL updates being received from a plurality of update processors;

upon receipt of the URL updates, storing the URL updates in a storage location included in the PAC file manager;

after a first predetermined time period, updating the dataset associated with each PAC file, wherein the updating comprises, for each PAC file, copying the stored updates into the dataset associated with the PAC file; and after a second predetermined time period, generating each PAC file, wherein:

each generated PAC file includes the appropriate URL updates; and during the PAC file generation, the PAC file server copies the segment of data included in the dataset associated with the first PAC file into the second PAC file.

9. The method of claim 8, further comprising deploying, by a deployment server included in the PAC file manager, the PAC files into a production environment.

10. The method of claim 9, wherein the PAC file manager comprises a plurality of general processors and a plurality of proxy server, the method further comprising: wherein:

each time a general processor, included in the plurality of general processors, launches a web browser to access a URL and/or changes a setting on the web browser, the general processor is configured to download one of the PAC files from the PAC server, said PAC file being stored in a temporary file associated with the general processor;

each PAC file includes instructions, said instructions to be used to direct the associated general processor how to access the URL, said instructions including directions for use by a web browser, the web browser associated with the general processor, said instructions for teaching how to reach the URL, said instructions identifying whether or not to use a proxy server, and when the instructions include using a proxy server, identifying which proxy server, included in the plurality of proxy server, is required to access the URL.

11. The method of claim 10, further comprising:

receiving a request, from a user, said user being entitled to update permissions, to change and/or update, in the second PAC file, the segment of data included in the dataset associated with the first PAC file; and upon receipt of the request, disabling the user from updating the segment of data.

12. The method of claim 10, further comprising:

receiving a request, from a user, said user being entitled to update permissions, to change and/or update, in the first PAC file, the segment of data included in the dataset associated with the first PAC file; and upon receipt of the request, enabling the user from updating the segment of data.

13. The method of claim 10, wherein each PAC file comprises a plurality of URLs mapped to the plurality of proxy servers.

14. The method of claim 13, wherein at least one URL, included in the pluralities of URLs, is exclusively resident on one of the PAC files.

15. The method of claim 10, wherein each PAC file comprises URLs mapped to categories of proxy servers.

16. The method of claim 15, wherein, upon determination of a category of a proxy server for the URL, the general processor transmits a request to a load balancer for a specific proxy server associated with the category of proxy servers.

* * * * *